Feb. 27, 1968  T. O. YINGST ET AL  3,370,753
PLURAL SOURCE FLUID DISPENSER
Filed June 2, 1966  3 Sheets-Sheet 1

FIG. I.

Thomas O. Yingst,
Leonard P. Traxel,
Inventors.
Koenig, Senniger,
Powers and Leavitt,
Attorneys.

United States Patent Office 3,370,753
Patented Feb. 27, 1968

3,370,753
PLURAL SOURCE FLUID DISPENSER
Thomas O. Yingst, Pevely, and Leonard P. Traxel, Affton, Mo., assignors to Universal Match Corporation, St. Louis, Mo., a corporation of Delaware
Filed June 2, 1966, Ser. No. 554,763
5 Claims. (Cl. 222—129.1)

ABSTRACT OF THE DISCLOSURE

Dispensing apparatus blends tap water and carbonated water in a blender, the carbonated water being supplied from a carbonator under a pressure which is subject to variation. The tap water is delivered under pressure to the blender from a regulator which is responsive to pressure in the carbonator and to pressure in the water outlet of the regulator for regulating the pressure of tap water delivered to the blender in accordance with the variations in pressure in the carbonator.

---

The invention involves an improvement upon the dispensers of the type shown in the copending coassigned U.S. patent application of Thomas O. Yingst and Burl E. Tucker, Jr., Ser. No. 402,229, filed Oct. 7, 1964, entitled Beverage Mixing And Dispensing System (now abandoned), and in the copending coassigned U.S. patent application of Thomas O. Yingst and Leonard P. Traxel, Ser. No. 471,967, filed July 14, 1965, entitled Dispensers (issued as U.S. Patent 3,347,421, Oct. 17, 1967). In each of these copending applications there is shown a beverage mixing and dispensing system adapted for mixing and dispensing high carbonated beverage, low carbonated beverage and uncarbonated beverage comprising a plurality of mixers in each of which water and syrup may mix to constitute a beverage, a beverage delivery line extending from each mixer, a dispensing valve in each beverage delivery line, a plurality of blenders, one connected to each mixer, each adapted to deliver a blend of carbonated water and tap water, or carbonated water per se, or tap water per se to the respective mixer, and means for delivering syrup to the mixers. Each blender is adapted to be supplied with high carbonated water under pressure from a carbonator and with tap water, and is adapted to be set to deliver the high carbonated water per se, or the tap water per se, or a blend of the two constituting low carbonated water. Among the several objects of this invention may be noted the provision of an improvement in this type of system, and which may also be useful in other types of systems where carbonated water and tap water are to be blended to constitute low carbonated water, for automatically regulating the pressure of tap water supplied to a blender in relation to the pressure of carbonated water supplied to the blender so as to assure blending of the two in the desired proportion; the provision of such an improvement, particularly for the system shown in said application Ser. No. 471,967, which accomplishes said automatic regulation while at the same time simplifying the system; and the provision of an improved regulator for such a system which functions in response to variations of pressure in the carbonator of the system automatically to regulate the pressure of tap water supplied to each blender in accordance with the pressure in the carbonator. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a view showing an apparatus incorporating the improvement of this invention;

Corresponding reference characters indicate corresponding parts throughout the several views of the drawings.

Figure 1:
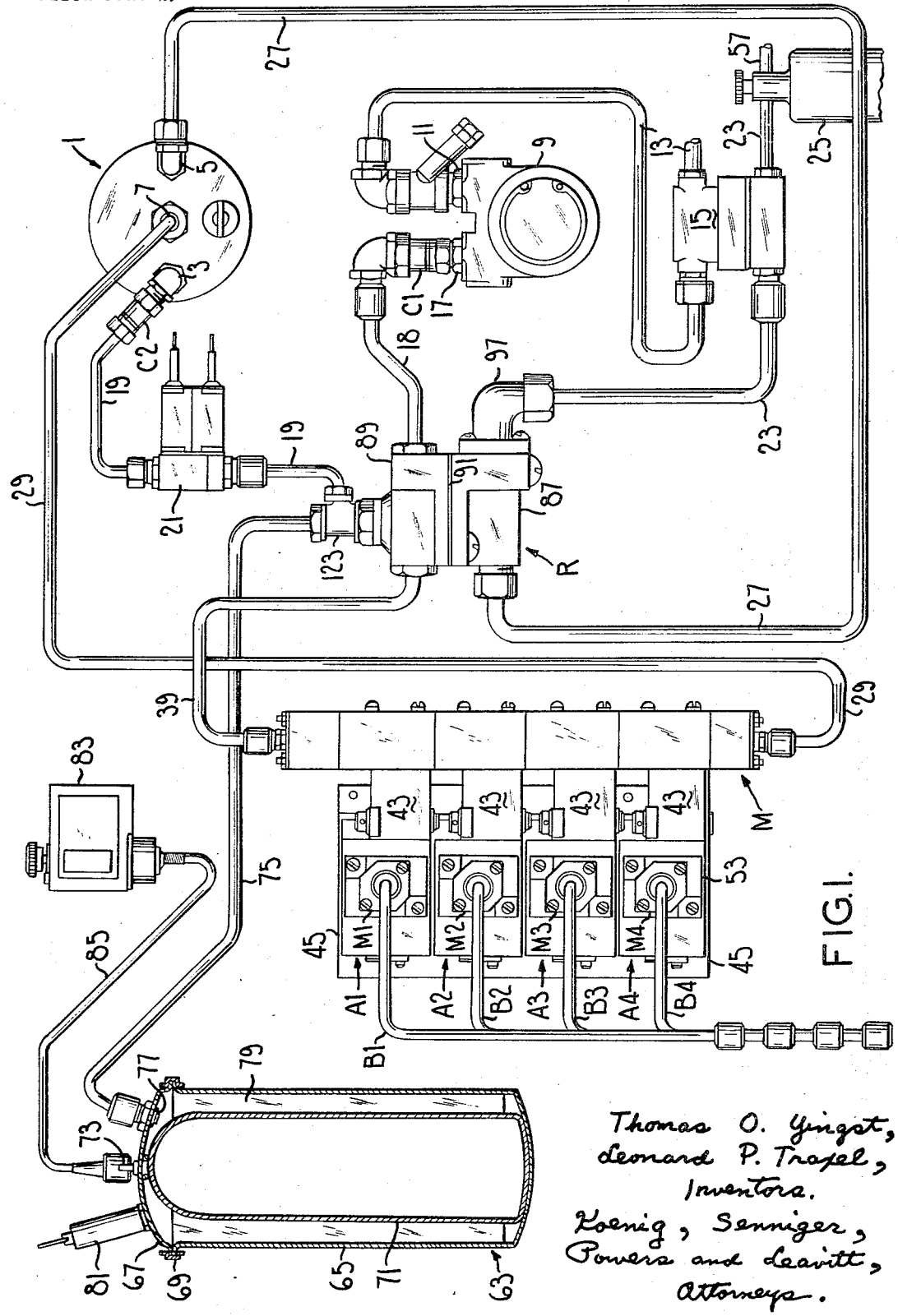

Referring to the drawings, first more particularly to FIG. 1, there is generally indicated at 1 a carbonator having an inlet 3 for tap water, an inlet 5 for carbon dioxide gas ($CO_2$ gas), and an outlet 7 for carbonated water. The carbonator may be of the same type as is shown in said application Ser. No. 471,967. A pump 9 is provided for pumping tap water into the carbonator, the pump having an inlet 11 to which is connected a tap water supply line 13. A regulator is indicated at 15. Outlet 17 of the pump is connected via an outlet check valve C1 and a tap water line 18 to a special regulator R of this invention (to be hereinafter described in detail) and regulator R is connected to inlet 3 of the carbonator by a tap water line 19 which has a solenoid valve 21 therein and a check valve C2. This valve is a shut-off valve; when it is opened, tap water may be delivered into the carbonator. $CO_2$ gas is supplied to the gas inlet 5 of the carbonator via a $CO_2$ line 23 leading from a tank fragmentarily indicated at 25 containing pressurized $CO_2$ gas to the regulator R and a line 27 extending from the regulator R to inlet 5. Regulator 15 is shown as connected in line 23, being of the type shown in the copending coassigned U.S. patent application of Thomas O. Yingst and Burl E. Tucker, Jr., Ser. No. 472,257, filed July 15, 1965, entitled Regulator, for regulating the pressure of the $CO_2$ gas in accordance with tap water temperature, and reference may be made to said application for details of regulator 15, which are not critical here.

A carbonated water delivery line 29 extends from the carbonated water outlet 7 of the carbonator directly to an elongate carbonated water chamber 33 (see FIG. 2) in an elongate manifold designated in its entirety by the reference character M. This corresponds to line 29 shown in said application Ser. No. 471,967, but with pressure regulator 31 of said application omitted. A tap water line 39 extends from regulator R to an elongate tap water chamber 41 (see FIG. 2) in the manifold. Manifold chambers 33 and 41, which hold under pressure supplies of carbonated water and tap water, respectively, are adapted to supply carbonated water and tap water to a plurality of blender and mixer assemblies, each designated generally by the reference character A, attached to the manifold. Four such blender and mixer assemblies, specifically designated A1, A2, A3 and A4, are shown in FIG. 1 by way of example. The manifold is adapted to be readily extended to accommodate a greater number of such assemblies (see the aforesaid U.S. patent application Ser. No. 471,967 for details, which are not critical here).

Figure 2:
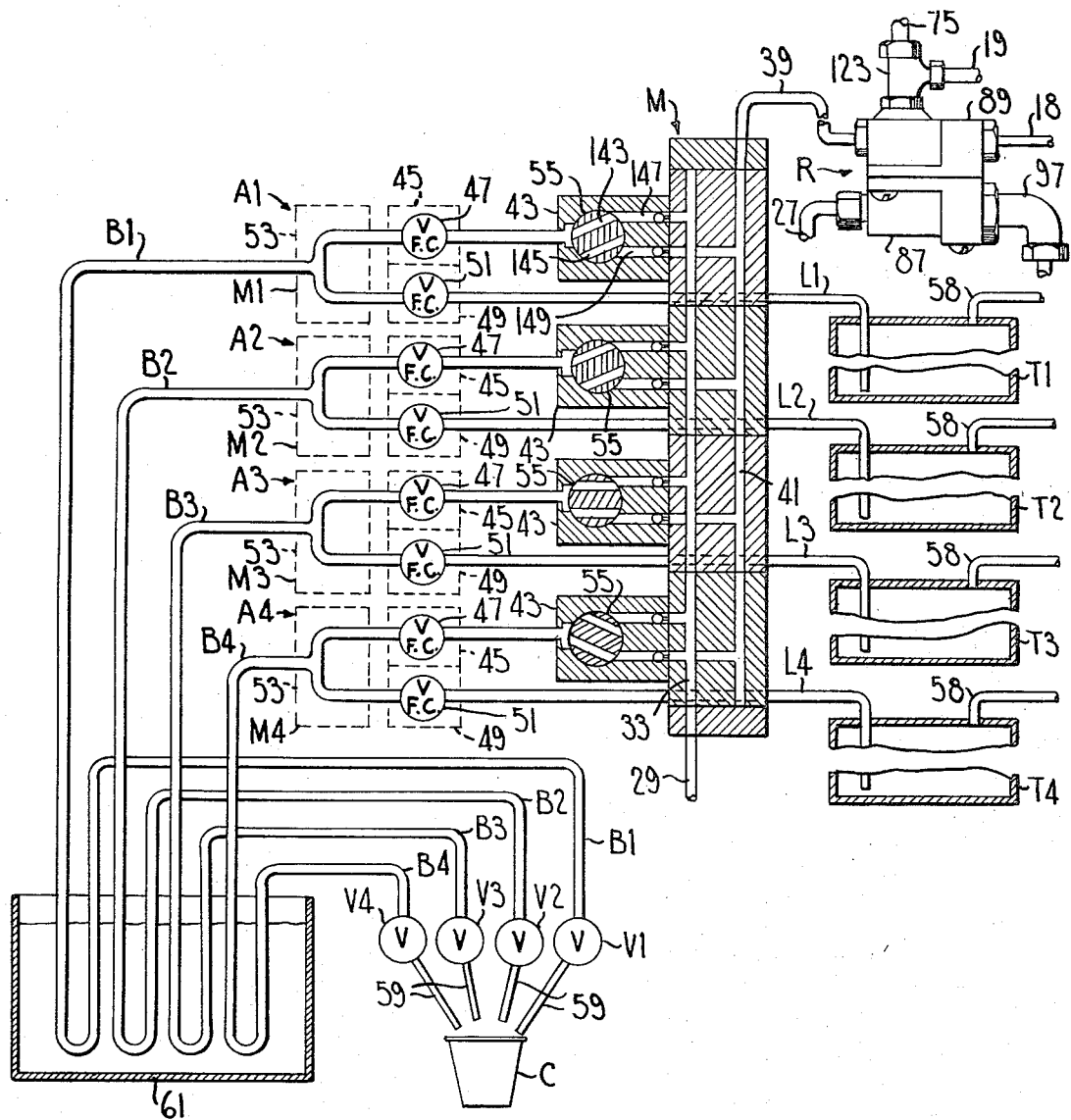
FIG. 2 is a schematic view of the apparatus.

Each of the blender and mixer assemblies A1–A4 comprises a blender valve body 43, a body 45 for a flow control valve 47 for water, a body 49 for a flow control valve 51 for syrup, and a mixer 53 (see FIG. 2). The blender valve body 43 has a blender valve 55 therein rotatable between a first limit for flow of carbonated water only from manifold chamber 33 through body 45 to the mixer body and a second limit for flow of tap water only from manifold chamber 41 through body 45 to the mixer, and having an unlimited range of intermediate positions for blending carbonated water and tap water in different proportions for supplying water of various degrees of carbonation to the mixer. See the aforesaid U.S.

patent application Ser. No. 471,967 for details of the blenders, mixers and flow control valves, which details are not critical here. With regard to each blender, the blender valve body has a check-valved passage 147 for carbonated water and a check-valved passage 149 for tap water and an outlet 163, and the blender valve 55 has ports 143 and 145. The mixers of assemblies A1, A2, A3 and A4 are specially designated M1, M2, M3 and M4, respectively.

As shown in FIG. 2, four syrup tanks T1, T2, T3 and T4 are provided, one for each of the assemblies A1, A2, A3 and A4. These tanks are pressurized by $CO_2$ gas from the $CO_2$ tank 25 via a line 57 from tank 25 (which may have a pressure regulator connected therein) and branch lines indicated at 58 in FIG. 2. Syrup delivery lines L1, L2, L3 and L4 connect the syrup tanks to the mixers 53 of the respective assemblies A1, A2, A3 and A4. Beverage delivery lines B1, B2, B3 and B4 extend from the outlets of the mixers 53 of the respective assemblies A1–A4 and terminate at dispensing valves V1, V2, V3 and V4, each of which has a nozzle 59 for delivering the beverage dispensed on opening thereof into a cup indicated at C. Valves V1–V4 may be manually operated in the case of a manual beverage dispenser, or electrically operated in the case of a coin-operated beverage vendor. They are herein described as manually operated valves for purposes of illustration.

As shown in FIG. 2, the beverage delivery lines B1–B4 pass through a cooling tank 61 for cooling the beverages therein. This tank may be a conventional "sweet-water bath," containing a cooling coil which freezes water in the tank into a block of ice. Other suitable cooling means may be provided for cooling the beverages between the mixers and the dispensing valves.

At 63 in FIG. 1 is indicated a tap water receiving and dispensing tank comprising a body 65 and a closure 67 for the body held thereon by a channel-section split clamping ring 69. Within the tank is an inflated bladder 71 (e.g., a rubber bladder) which is sealed from the interior of the tank. The bladder is adapted to be inflated via an inflating valve 73 (which may be a conventional tire valve) mounted in the center of closure 67 and having the bladder secured to its inner end on the inside of the closure. A tap water line 75 connected to line 19 between regulator R and valve 21 extends to port 77 in the closure 67. Tap water is adapted to enter the chamber 79 in tank 63 surrounding the inflated bladder via line 75 and port 77, and to exit from this space via port 77 and line 75. Tank 63 has a safety valve 81 on closure 67. At 83 is indicated a control switch which is responsive to the pressure of water in space 79 in tank 63 via an interconnection 85 between closure 67 and the switch. Switch 83 is adapted to close when the pressure of water in tank 63 reaches a lower limit (e.g., 120 p.s.i.) and to open when the pressure of water in tank 63 reaches an upper limit (e.g., 150 p.s.i.).

Figure 3:
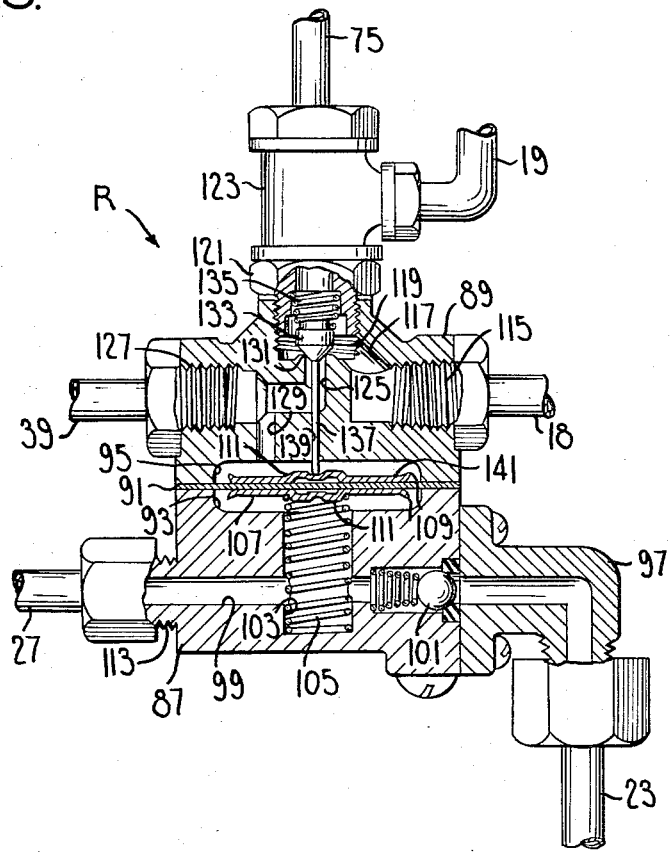
FIG. 3 is a section of an improved pressure regulator used in the apparatus.

As shown in FIGS. 1 and 3, regulator R comprises two body members 87 and 89 having a flexible diaphragm 91 clamped therebetween. Body member 87 is recessed to provide a $CO_2$ gas chamber 93 on one side of the diaphragm. Body member 89 is recessed to provide a chamber 95 for tap water on the other side of the diaphragm. The $CO_2$ gas supply line 23 is connected to an inlet elbow 97 secured to body member 87 at one side thereof. This elbow communicates with a passage 99 across body member 87. A spring-biased ball check valve 101 is provided at the entrance of passage 99. This valve is adapted to open in downstream direction. Passage 99 is in communication with chamber 93 downstream from the check valve 101 via a passage 103 which intersects passage 99 at right angles thereto. A coil compression spring 105 seated at one end against the inner end of passage 103 extends into the chamber 93 and reacts against a sheet metal back-up plate 107 engaging the diaphragm 91 to bias the diaphragm outward with respect to chamber 93. The plate 107 is essentially a flat circular plate with a curved peripheral lip 109 bent away from the diaphragm and a central annular boss 111 extending away from the diaphragm for seating the diaphragm end of the spring. Body member 87 has a nipple 113 at the exit end of passage 99 for connection of line 27.

Body member 89 has a tap water inlet 115 at one side for connection of line 18 from the pump. From this inlet, there is an angled passage 117 to recess 119 in the head of body member 89 at right angles to the inlet. A fitting 121 is threaded in this recess for connection of one end of the head to a T connection 123. Line 19 is connected to the stem of this T connection 123, and line 75 is connected to the other end of its head. Body member 89 has a valve passage 125 extending from recess 119 to a tap water outlet 127 opposite inlet 115, and a port 129 interconnecting outlet 127 and chamber 95. Body member 95. Body member 89 is formed at the inner end of outlet 119 around the end of valve passage 125 with a valve seat 131 engageable by valve 133 accommodated in the recess 119. Valve 133 is biased to close against the seat by a coil compression spring 135 reacting from an internal shoulder in fitting 121, and has a stem 137 extending through valve passage 125 and through a hole 139 in body member 89 into engagement with the center of a diaphragm back-up plate 141 engaging the diaphragm on the side thereof opposite plate 107. The plate 141 is identical to plate 107, and the end of the valve stem 137 engages in the center of the annular boss 111 of plate 141. Line 39 is connected to outlet 127.

As will appear from the above, chamber 93 of regulator R is in communication with the carbonator 1 via line 27 and passages 99 and 103, and holds $CO_2$ gas at the pressure of $CO_2$ gas in the carbonator (whatever this pressure may be). Thus, the face of the diaphragm 91 toward chamber 93 is exposed to the pressure which exists in the carbonator. This pressure, in conjunction with the bias of spring 105, tends to flex the diaphragm away from chamber 93 in the direction for opening the valve 133. The other face of the diaphragm is exposed to the pressure of tap water in the outlet 127 of the regulator. Consequently, the tendency of the $CO_2$ gas pressure and the bias of spring 105 to open the valve 133 is resisted by the tap water pressure in chamber 95 and the bias of valve spring 135. Spring 105 is preferably a light spring exerting only a light bias on the diaphragm. Spring 135 may be made to exert a bias equal to that of spring 105, or somewhat more or less than that of spring 105. In any event, the diaphragm is primarily subject to the difference between the pressure of the $CO_2$ gas in chamber 93 and the pressure of tap water in chamber 95. Thus, on increase in $CO_2$ gas pressure in chamber 93 relative to tap water pressure in chamber 95, the diaphragm is flexed away from chamber 93 and acts via valve stem 137 to open the valve 133 and admit tap water from recess 119 to outlet 127 via passage 125, thereby increasing the pressure of the tap water in the outlet 127, and when this pressure reaches a predetermined value (dependent on the bias of springs 105 and 135), the diaphragm flexes back and spring 135 closes the valve. If the bias forces of the springs are equal, the pressure of the tap water in outlet 127 will be controlled to be the same as the pressure of the $CO_2$ gas (whatever that pressure may be). If spring 105 has a greater bias than spring 135, the pressure of the tap water in outlet 127 will be controlled to be somewhat higher than the pressure of the $CO_2$ gas, since higher water pressure will be required to effect closing of the valve, and, conversely, if spring 105 has a lower bias than spring 135, the pressure of the tap water will be controlled to be somewhat less than the pressure of the $CO_2$ gas. It is somewhat preferable to use a spring 105 with a slightly greater force than spring 135, so that pressure of tap water in outlet 127 is controlled to be slightly higher than pressure in carbonator 1 to insure against carbonated water entering the tap water system in the event of a check valve leak.

Figure 4:
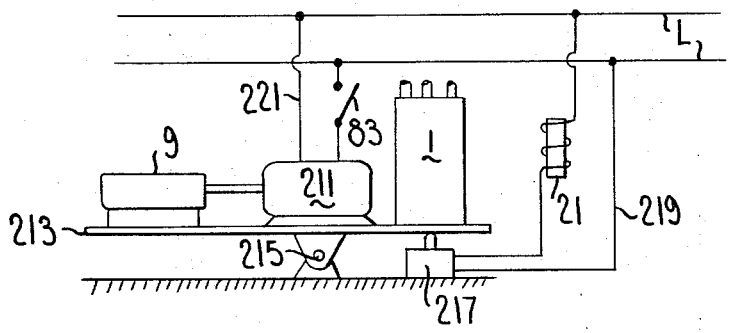
FIG. 4 is a view showing a mounting arrangement for the carbonator of the apparatus and associated electrical circuitry.

Referring to FIG. 4, the carbonator 1, the pump 9 and an electric motor 211 for driving the pump 9 are shown to be mounted on a platform 213 which is pivoted at 215 in such manner that the weight of the carbonator (and water therein) is brought to bear on a control switch 217. When the carbonator is full of carbonated water, switch 217 is open. When the carbonated water in the carbonator drops below a predetermined level, the right end of the platform as shown in FIG. 4 swings up to effect closure of the switch. The switch is interconnected with the solenoid of solenoid valve 21 as indicated at 219 across a line L. Motor 211 is interconnected with pressure switch 83 as indicated at 221 across the line L. The arrangement is such that on demand for water by the carbonator, switch 217 closes to energize and open the valve 21, and on closure of pressure switch 83, motor 211 is energized to drive the pump.

Operation is as follows:

It will be understood that in normal operation of the dispensing system, there will be ready-mixed supplies of beverages of different flavors standing under pressure in mixers M1, M2, M3 and M4 and in beverage delivery lines B1, B2, B3 and B4 down to the dispensing valves V1, V2, V3 and V4. The carbonator 1 will contain a contain a supply of carbonated water having a desired high carbonation factor (e.g., a factor of 4.0, meaning a ratio of volume of gas to volume of water of 4.0 to 1). Tank 63 will contain tap water pressurized by the inflated bladder 71.

It may be assumed, for example, that mixers M1 and M2 are to supply high carbonated drinks, that mixer M3 is to supply a low carbonated drink, and that mixer M4 is to supply an uncarbonated drink. In such case, blender valves 55 of the first two blenders 43 associated with mixers M1 and M2 are set for flow of carbonated water only from carbonated water manifold chamber 33 to the mixers M1 and M2 as shown in FIG. 2. The blender valve 55 of the third blender is set for flow of both carbonated water and tap water to the mixer M3 from manifold chambers 33 and 41 in the necessary proportion according to the low degree of carbonation desired, and the blender valve 55 of the fourth blender is set for flow of tap water only from chamber 41 to the mixer M4, as shown in FIG. 2.

Assuming, for example, that dispensing valve V1 is opened for dispensing the high carbonated beverage of the first flavor held in line B1 and mixer M1 into a cup at C, the beverage flows out into the cup under the pressure provided in the system by the pressure of $CO_2$ gas in the carbonator 1. High carbonated water flows from the carbonator 1 via line 29 to manifold chamber 33, from chamber 33 through the respective blender 43, and flow control valve 47 to mixer M1. Syrup flows from syrup tank T1 via line L1 through flow control valve 51 of assembly A1, thence to mixer M1. The high carbonated water and syrup mix in mixer M1 to constitute the high carbonated beverage of the first flavor, thereby to replenish the amount of beverage of this flavor drawn off by the opening of dispensing valve V1. The syrup is delivered from tank T1 on account of the drop in pressure in line B1 which occurs on opening of valve V1, enabling $CO_2$ pressure in tank T1 to force syrup out of this tank. Flow control valve 51 provides for flow of syrup at the appropriate rate in order to deliver the amount of syrup needed in proportion to the amount of carbonated water.

Dispensing of beverage from lines B2, B3 and B4 and replenishment of beverage in these lines occurs on operation of dispensing valves V2, V3, V4 in a manner similar to that above described except that, as to B3, high carbonated water and tap water are blended in the blender of assembly A3 to supply low carbonated water and, as to B4, tap water alone is supplied to mixer M4 to provide an uncarbonated beverage. Tap water in manifold chamber 41 is under pressure as a result of pressurization of tap water in tank 63 by bladder 71. Accordingly, when dispensing valve V3 is opened, tap water flows from chamber 41 through the blender of assembly A3 to mixer M3, and when dispensing valve V4 is opened, tap water flows from chamber 41 through the blender of assembly A4 to mixer M4. The result of flow of tap water out of chamber 41 is to reduce the pressure of tap water in tank 63. Upon reduction of this pressure below the lower pressure limit of switch 83 (e.g., 120 p.s.i.), switch 83 closes. This energizes motor 211 to drive pump 9 to deliver tap water to tank 63 via line 75 to bring the tap water pressure back up and sustain the requisite flow of tap water.

Shut-off valve 21 remains closed until the supply of carbonated water in carbonator 1 is depleted to the point where the right end of platform 213 carrying the carbonator swings up far enough to effect closure of switch 217, whereupon valve 21 opens. When this valve 21 opens, tap water flows out of tank 63 into the carbonator via lines 75 and 19 under the pressure of bladder 71. This drops the tap water pressure in tank 63 and switch 83 and the latter closes to effect operation of pump 9 to deliver tap water to the carbonator 1 and the tank 63. Pump 9 remains in operation until tap water pressure is built back up in tank 63 to the upper pressure limit (e.g., 150 p.s.i.) of switch 83. If the carbonator demand has not been fully satisfied when the pump shuts off, the remainder of the tap water needed to satisfy the carbonator demand is supplied from the tank 63. When the carbonator demand is satisfied, switch 217 opens to deenergize and close the shut-off valve 21. Thus, tank 63 with the bladder 71 for pressurizing tap water therein functions to balance the system as regards supply of tap water to the carbonator for carbonation and supply of tap water to the manifold M for blending with high carbonated water to supply low carbonated water or for delivery without blending with high carbonated water to serve an uncarbonated beverage, and enables operation even though tap water supply pressure may be low.

With particular regard to the blender 43 for blending high carbonated water from manifold chamber 33 and tap water from manifold chamber 41 to supply low carbonated water to mixer M3, the pressure regulator R functions automatically to regulate the pressure of tap water being delivered to this blender to compensate for variations in the pressure of carbonated water being delivered to this blender so as to assure blending of the carbonated water and tap water in the proportion required to obtain the desired degree of carbonation for the low carbonated water to be supplied to mixer M3. Thus, if the pressure of the carbonated water increases, the pressure of the tap water increases in correspondence, and vice versa. The same, of course, would apply to any other blender 43 as to which the valve 55 would be set to blend carbonated water and tap water. It is noteworthy that use of regulator R enables omission of the pressure regulator 31 shown in the aforesaid application Ser. No. 471,967, thus simplifying the system.

The construction of pressure regulator R with plates 107 and 141 each having the central annular boss 111 is an important feature of the regulator. It will be observed that, with the upper end of spring 105 engaging plate 107 and surrounding the boss 111 on plate 107, the plate 107 is held centered with respect to the diaphragm 91 and the upper end of the spring is seated. Similarly, with the lower end of the valve stem 137 engaged in the center of the annular boss 111 on plate 141, the plate 141 is held centered with respect to the diaphragm and the lower end of the valve stem is seated. This is superior to conventional pressure regulator construction wherein the diaphragm plates are fastened to the diaphragm as by a rivet passing through a hole in each plate and a hole in the diaphragm in order to hold the plates centered. In such prior construction, the provision of the hole in the diaphragm for the rivet (or other fastener) may result in development of a leak through the diaphragm, and elimination of such a hole eliminates the possibility of development of a leak. It will be observed that when the plates are fastened together as by a rivet through a hole in the diaphragm in the conventional construction, the diaphragm must be compressed between the plates to seal the hole, and fatigue of the diaphragm due to this compression may ultimately result in a leak. The rivetless construction of this invention eliminates any necessity for such diaphragm compression, and hence eliminates such diaphragm fatigue.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Dispensing apparatus comprising a blender for blending tap water and carbonated water, a carbonator for holding a supply of carbonated water under pressure which is subject to variation, means for delivering carbonated water under pressure from the carbonator to the blender, and means for delivering tap water under pressure to the blender including a pressure regulator responsive to pressure in the carbonator for regulating the pressure of tap water delivered to the blender in accordance with variation in pressure in the carbonator.

2. Dispensing apparatus as set forth in claim 1 wherein said pressure regulator comprises a diaphragm and has first and second chambers on opposite sides of the diaphragm, the first chamber being in communication with the carbonator for pressurization of one side of the diaphragm in accordance with pressure in the carbonator, said pressure regulator having a tap water inlet, a tap water outlet interconnected with said blender and in communication with said second chamber for pressurization of the other side of the diaphragm in accordance with pressure of tap water in said outlet, and a valve controlled by the diaphragm for controlling flow of tap water from said inlet to said outlet.

3. Dispensing apparatus as set forth in claim 2 wherein said pressure regulator has a $CO_2$ gas inlet and a $CO_2$ gas outlet in communication with said first chamber, and wherein said first chamber is in communication with the carbonator via a line interconnecting the $CO_2$ gas outlet and the carbonator for delivering $CO_2$ gas supplied to the $CO_2$ gas inlet to the carbonator.

4. Dispensing apparatus as set forth in claim 3 having a first spring acting upon the diaphragm in the direction for opening said valve and a second spring acting in opposition to the first spring for biasing the valve in closing direction.

5. Dispensing apparatus as set forth in claim 3 having a tap water pump, a line for delivery of tap water from the outlet of the pump to the tap water inlet of said pressure regulator, a line for delivery of tap water from the outlet of the pump to the carbonator, a shut-off valve in said line to the carbonator, means defining a tap water chamber in communication with said line to the carbonator between the pump outlet and shut-off valve and also in communication with the tap water inlet of said pressure regulator, and means for pressurizing tap water in said tap water chamber.

References Cited

UNITED STATES PATENTS

| | | | |
|---|---|---|---|
| 1,753,662 | 4/1930 | Merker | 137—111 |
| 1,885,565 | 11/1932 | Terry | 137—114 X |
| 2,315,512 | 4/1943 | Everson | 137—114 |
| 2,380,956 | 8/1945 | Evarts | 137—114 X |
| 3,194,254 | 7/1965 | Zmek | 137—114 |

SAMUEL F. COLEMAN, *Primary Examiner.*